US010941695B2

(12) United States Patent
Tholander et al.

(10) Patent No.: US 10,941,695 B2
(45) Date of Patent: Mar. 9, 2021

(54) SYSTEM FOR COOLING HEAT-GENERATING ELECTRONIC COMPONENTS OF A VEHICLE

(71) Applicant: Volvo Car Corporation, Gothenburg (SE)

(72) Inventors: Fredrik Tholander, Gothenburg (SE); Magnus Backelie, Gothenburg (SE); Linda Tegehall, Gothenburg (SE); Samuel Swedenborg, Gothenburg (SE); Ulf Nilsson, Gothenburg (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 16/458,259

(22) Filed: Jul. 1, 2019

(65) Prior Publication Data

US 2020/0018222 A1 Jan. 16, 2020

Related U.S. Application Data

(60) Provisional application No. 62/695,880, filed on Jul. 10, 2018.

(51) Int. Cl.
*F01P 7/14* (2006.01)
*F01P 3/18* (2006.01)
(Continued)

(52) U.S. Cl.
CPC ............ *F01P 7/14* (2013.01); *B60H 1/00271* (2013.01); *B60H 1/00278* (2013.01);
(Continued)

(58) Field of Classification Search
CPC .. F01P 7/14; F01P 2003/185; F01P 2003/187; F02B 29/0443; B60H 1/00271;
(Continued)

(56) References Cited

U.S. PATENT DOCUMENTS

| 2005/0279113 A1* | 12/2005 | Hoshi | F01P 11/10 62/239 |
| 2007/0181356 A1* | 8/2007 | Ando | F01P 7/048 180/65.27 |

(Continued)

*Primary Examiner* — Jacob M Amick
(74) *Attorney, Agent, or Firm* — Clements Bernard Walker; Christopher L. Bernard

(57) ABSTRACT

Cooling systems for cooling various heat generating components of a vehicle are provided. A cooling system for a vehicle, according to one embodiment, includes a primary cooling assembly arranged near the front of the vehicle. The primary cooling assembly may include at least one of an air conditioning condenser configured for cooling an interior passenger space of the vehicle and a radiator for cooling a power source of the vehicle. The cooling system also includes a first electronics radiator arranged near the front of the vehicle in front of and/or adjacent to the primary cooling assembly and a second electronics radiator arranged in front of and/or adjacent to the primary cooling assembly. One or more cooling lines are operable for carrying a cooling fluid between the first and second electronics radiators and one or more electronic components disposed in the vehicle remote from the first and second electronics radiators.

20 Claims, 5 Drawing Sheets

(51) Int. Cl.
*B60H 1/00* (2006.01)
*F02B 29/04* (2006.01)
*B60H 1/32* (2006.01)

(52) U.S. Cl.
CPC ......... *B60H 1/323* (2013.01); *F02B 29/0443* (2013.01); *F01P 2003/182* (2013.01); *F01P 2003/185* (2013.01); *F01P 2003/187* (2013.01)

(58) Field of Classification Search
CPC ............ B60H 1/00278; B60H 1/00328; B60H 1/00392; B60H 1/2215; B60H 1/323
See application file for complete search history.

(56) References Cited

U.S. PATENT DOCUMENTS

| | | |
|---|---|---|
| 2009/0266508 A1 | 10/2009 | Furuta |
| 2010/0155018 A1* | 6/2010 | Goenka .................. F25B 21/04 165/59 |
| 2013/0333640 A1 | 12/2013 | Kardos et al. |
| 2014/0202660 A1 | 7/2014 | Seligman |
| 2016/0023532 A1 | 1/2016 | Gauthier |
| 2018/0001784 A1* | 1/2018 | Porras ...................... B60K 1/04 |

* cited by examiner

SYSTEM FOR COOLING HEAT-GENERATING ELECTRONIC COMPONENTS OF A VEHICLE

CROSS-REFERENCE TO RELATED APPLICATION

The present disclosure claims the benefit of priority of U.S. Provisional Patent Application No. 62/695,880, filed on Jul. 10, 2018, and entitled "ELECTRONICS COOLING ASSEMBLY AND METHOD FOR AN AUTONOMOUS DRIVING VEHICLE OR THE LIKE," the contents of which are incorporated by reference herein.

TECHNICAL FIELD

The present disclosure relates generally to the automotive field. More specifically, the present disclosure relates to heat exchangers and cooling assemblies for cooling various heat generating components of a vehicle, particularly electronic components used by an autonomous-driving (AD) or self-driving vehicle.

BACKGROUND

Autonomous-driving (AD) vehicles and the like utilize a wide array of electronic systems and components. These electronic systems and components include, but are not limited to, global positioning systems (GPS), inertial guidance systems (i.e., accelerometers and gyroscopes) providing linear and rotational motion information, video cameras, light detection and ranging (LIDAR) systems, and radar systems. Often, many of these electronic systems and components are housed in an electronics housing or pod on the rooftop of the vehicle, both saving in-vehicle space and providing required device visibility.

More specifically, the video cameras provide a visual 360-degree perspective and/or bird's eye view (BEV) of the environment surrounding the vehicle. This allows travel lanes and markers to be identified, objects to be detected, etc. However, it can be difficult to properly position video cameras and keep them adequately clean. Also, video cameras require intensive computational processing to exploit fully and lack some of the desired depth perception capabilities. Therefore, LIDAR systems are typically relied upon more heavily. LIDAR systems provide rapid and accurate three-dimensional (3-D) assessment of the environment surrounding the vehicle, especially at greater distances, enabling effective object identification, motion vector determination, collision prediction, and avoidance implementation. These LIDAR systems may be solid state scanning or rotating systems and utilize laser pulses that are timed with the responses of associated detectors to provide range and motion information. In short-distance applications, where LIDAR systems are not as effective, radar systems operating at approved frequencies providing desirable radio frequency (RF) propagation characteristics and sufficient resolution are more appropriately relied upon.

The above electronic systems and methods are all coupled to and operated by one or more processors that form the brains of an AD vehicle. These processors gather information from the various sensor systems, apply artificial intelligence (AI) to the information, coordinate responsive AD vehicle actions, receive corresponding feedback, etc. As the processors have developed to analyze driving conditions more like human drivers, the number and complexity of computations performed has skyrocketed.

All of these robust electronic systems and components generate a great deal of heat and must be cooled to operate properly. This is often done using dedicated cooling systems and/or complex conduit networks linking conventional cooling systems to the electronic systems and components. However, this can be inadequate as more and more computational capability is demanded from the processors. Thus, what is still needed in the art is an improved electronics cooling assembly and method for an AD vehicle or the like, such that the electronic systems and components disposed therein may be adequately cooled and function properly.

SUMMARY

In various aspects, the present disclosure provides an improved electronics cooling assembly for an AD vehicle or the like, such that the electronic systems and components disposed therein may be adequately cooled and function properly. The electronics cooling assembly includes one or more electric drive (ED) or electronic device radiators in front of and/or adjacent to a conventional air conditioner (AC) condenser, and optionally in front of and/or adjacent to a conventional radiator (e.g., battery radiator for an electric vehicle, motor/engine radiator for a vehicle powered by an internal combustion engine, etc.). The electronics cooling assembly may include second, third, or more ED radiator that may be arranged adjacent to a first ED radiator that may be utilized at present. These additional ED radiators are thermally coupled to the cooled electronics, typically located rearward in the AD vehicle, such as in the back of the AD vehicle, by one or more cooling lines that carry cooling fluid between the ED radiators and the cooled electronics. This configuration provides an additional supply of cooling fluid to the cooled electronics, resulting in superior cooling performance.

In one specific aspect, a cooling system for a vehicle is provided, whereby the cooling system includes a primary cooling assembly arranged near the front of the vehicle. The primary cooling assembly may include at least one of an air conditioning condenser configured for cooling an interior passenger space of the vehicle and/or a radiator for cooling a power source of the vehicle. The cooling system further includes a first electronics radiator arranged near the front of the vehicle in front of and/or adjacent to the primary cooling assembly and a second electronics radiator arranged in front of and/or adjacent to the primary cooling assembly. Furthermore, the cooling system includes one or more cooling lines operable for carrying a cooling fluid between the first and second electronics radiators and one or more electronic components disposed in the vehicle remote from the first and second electronics radiators.

In another implementation, the present disclosure provides an autonomous-driving vehicle, which includes an air conditioning assembly having at least an air conditioner condenser, a battery cooling assembly having at least a battery radiator, and an electronics cooling assembly. The electronics cooling assembly includes a first electronics radiator disposed in front of the air conditioner condenser, a second electronics radiator disposed in front of the battery radiator and adjacent to the first electronics radiator, and a third electronics radiator disposed in front of the battery radiator and adjacent to the first and second electronics radiators. The electronics cooling assembly further includes one or more cooling lines operable for carrying a cooling fluid from the second and third electronics radiators and one or more electronic components disposed remotely in the vehicle.

BRIEF DESCRIPTION OF THE DRAWINGS

The present disclosure is illustrated and described herein with reference to the drawing, in which.

DESCRIPTION OF EXEMPLARY EMBODIMENTS

According to various aspects, the present disclosure provides a cooling system having an electronics cooling assembly for cooling electronic components of a vehicle, particularly for an autonomous-driving (AD) vehicle, self-driving vehicle, or the like. With additional electronic systems and components used within vehicles, particularly those having specific electronics for automatically controlling the driving of the vehicle, these electronic systems and components may require additional cooling systems to adequately cool the electronics for proper functionality.

The electronics cooling assemblies described in the present disclosure provide one or more additional electronic driving (ED) radiators in front of and/or adjacent to the conventional AC condenser and/or conventional power source radiator (e.g., radiator for internal combustion engine and/or radiator for a battery system of an electric vehicle). These additional ED radiators may be thermally coupled to the cooled electronics, typically located rearward in the AD vehicle, such as in the back of the AD vehicle, by one or more cooling lines that carry cooling fluid between the ED radiators and the heat generating electronics. This configuration provides an additional supply of cooling fluid for cooling the electronics, resulting in superior cooling performance compared to conventional cooling systems. Various embodiments of these cooling systems are described below.

Figure 1:
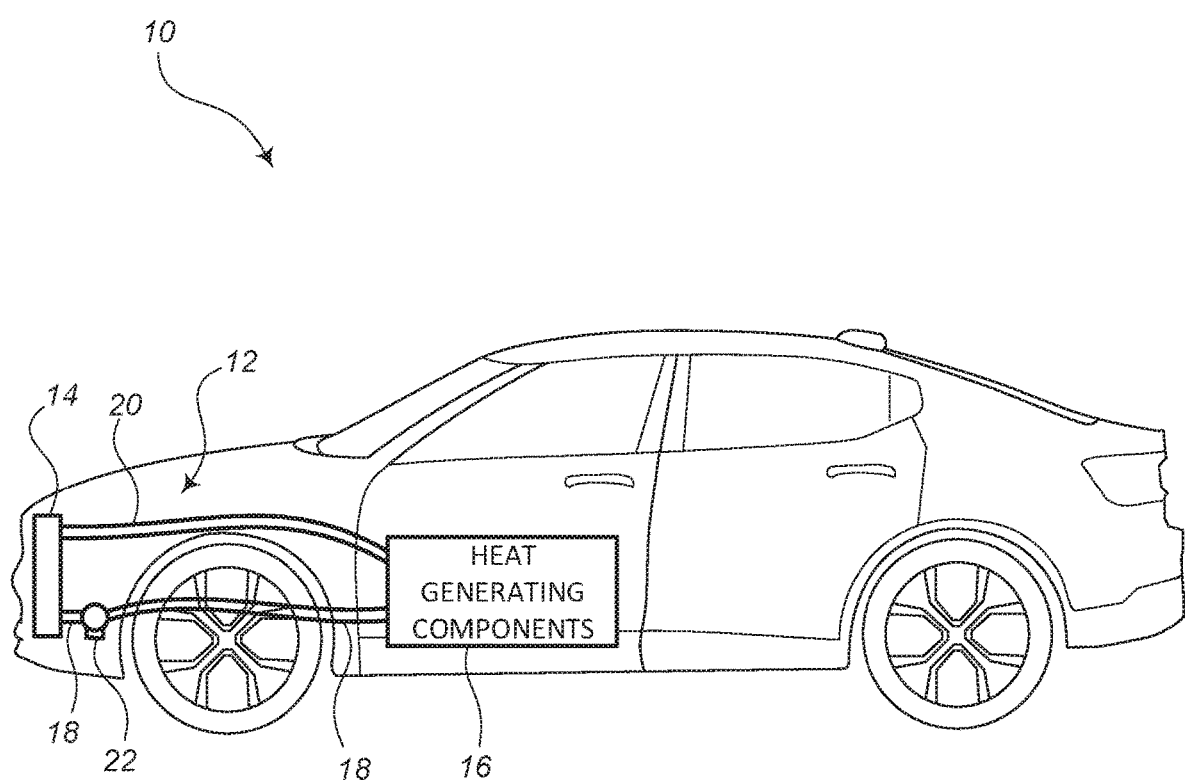
FIG. 1 is a side view of a vehicle, such as an autonomous vehicle or the like, including a cooling system for cooling various heat generating components of the vehicle, according to various embodiments of the present disclosure.

FIG. 1 shows a side view of a vehicle 10 according to some embodiments. For example, the vehicle 10 may include a cooling system 12 comprising at least a cooling assembly 14, which is configured to cool various heat generating components 16 of the vehicle 10. For example, the heat generating components 16 may include an internal combustion engine, a battery system for electrically driving the vehicle 10, motors, and/or electronic components (e.g., components for controlling the vehicle 10 in an autonomous or self-driving fashion). In addition, the heat generating components 16 may further include a heated interior space or passenger space within the vehicle 10 where cooled or air-conditioned air can be supplied into the interior passenger space.

The cooling system 12 includes the cooling assembly 14, which may include a plurality of radiators and/or condensers for cooling a fluid (e.g., liquid coolant and/or condensed air). The cooling system 12 further includes a plurality of output cooling lines 18 configured to be supplied from the various radiators and/or condensers of the cooling assembly 14 to the various heat generating components 16. Return lines 20 may be used to return the cooling fluid, which may be heated by the heat generating components 16, back to the cooling assembly 14. In addition, one or more fluid pumps 22 may be used for circulating the cooling fluid throughout the various cooling systems.

Figure 2:
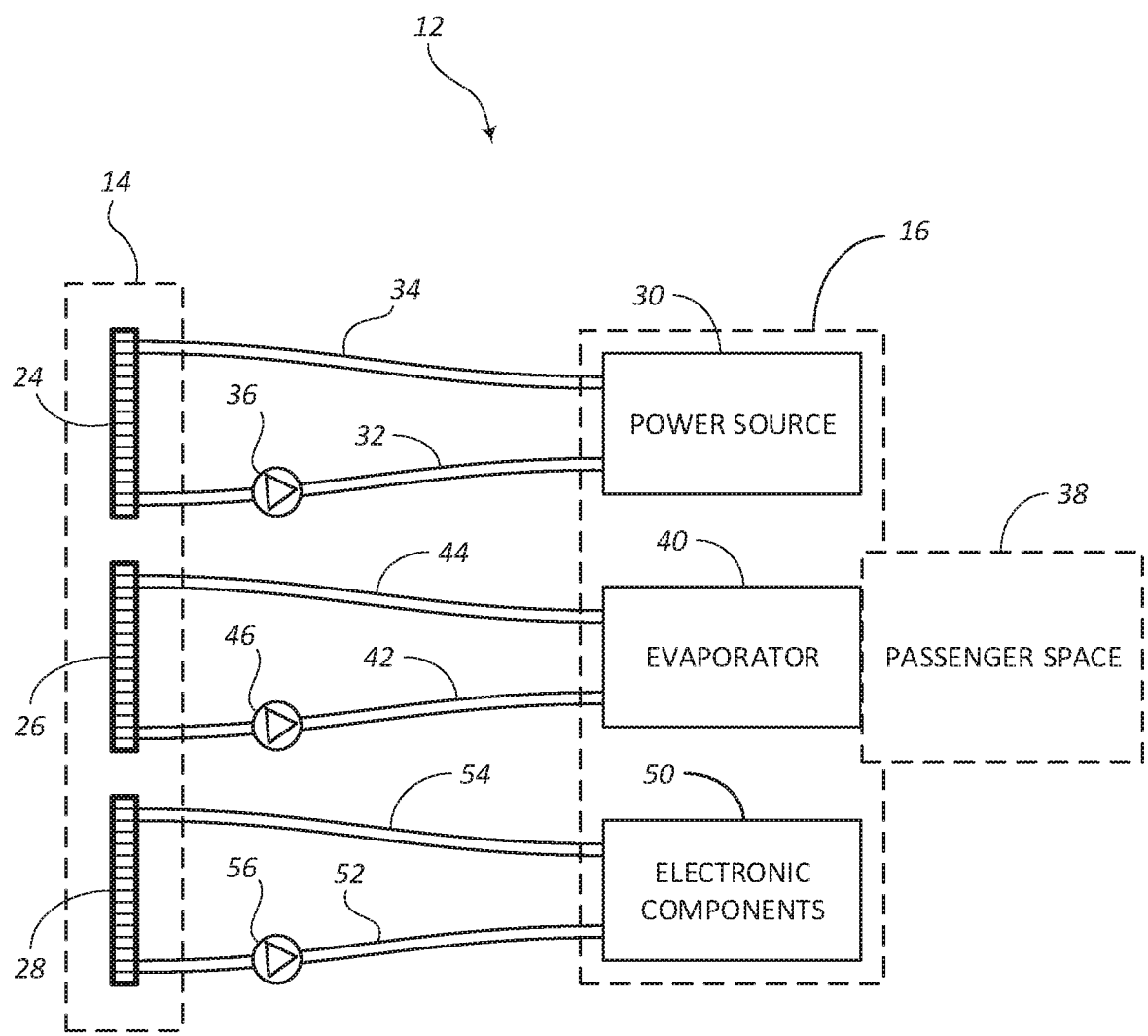
FIG. 2 is a schematic diagram illustrating a cooling system for a vehicle, according to various embodiments of the present disclosure.

FIG. 2 is a schematic diagram illustrating an embodiment of the cooling system 12 shown in FIG. 1 for use in the vehicle 10. The cooling system 12 includes the cooling assembly 14 for cooling various heat generating components 16 (e.g., vehicle parts or spaces) of the vehicle 10. In this respect, the cooling system 12 may include a plurality of independent cooling subsystems, where each cooling subsystem is configured for cooling one particular component or group of components of the vehicle 10. For example, in the illustrated embodiment, the cooling assembly 14 may include three different cooling devices or systems used in three different cooling subsystems. In this respect, the cooling assembly 14 includes a primary radiator 24, a primary condenser 26, and an electronics cooling system 28. As mentioned in more detail below, the electronics cooling system 28 may include multiple electronics radiators.

The primary radiator 24 may be configured to cool one or more power sources 30 of the vehicle. For example, the power source(s) 30 may include an internal combustion engine, a battery system (e.g., for powering an electric vehicle), a hybrid power system (e.g., including an engine and battery system for powering a hybrid vehicle), or other suitable type of power plant for powering the vehicle 10. A first fluid line 32 may be configured to carry cooling fluid from the primary radiator 24 to the power source 30. A second fluid line 34 may be configured to carry the cooling fluid from the power source 30 back to the primary radiator 24. A first fluid pump 36 may be used to pump the cooling fluid through the first closed subsystem including the primary radiator 24, first fluid line 32, power source 30, and second fluid line 34.

The primary condenser 26 may be configured to cool a passenger space 38 within an interior of the vehicle 10 by providing cooling fluid (e.g., condensed air) to an evaporator 40. A fan (not shown) may be used to blow the cooled air created by the evaporator 40 into the passenger space 38. The primary condenser 26 may provide the cooling fluid through a first fluid line 42 configured to carry the cooling fluid to the evaporator 40. A second fluid line 44 may be configured to carry the cooling fluid from the evaporator 40 back to the primary condenser 26. A second fluid pump 46 may be used to pump the cooling fluid through the second closed subsystem including the primary condenser 26, first fluid line 42, evaporator 40, and second fluid line 44.

The electronics cooling system 28 may be configured to cool electronic components 50 of the vehicle 10. The electronic components 50 may include at least one of an AD computer or electronic box (e-box) for controlling driving operations of the AD vehicle, an on-board charger (OBC), a power inverter, an inverter electric motor (IEM), and/or an electric rear axle driver (ERAD), a combined inverter and DC/DC converter (CIDD), and/or other electronics.

A first fluid line 52 may be configured to carry cooling fluid from the electronic cooling system 28 to the electronic components 50. A second fluid line 54 may be configured to carry the cooling fluid from the electronic components 50 back to the electronics cooling system 28. A third fluid pump 56 or a third set of fluid pumps may be used to pump the cooling fluid through the third closed subsystem including the electronics cooling system 28, first fluid line 52, the electronic components 50, and second fluid line 54. In some embodiments, this third cooling subsystem may include multiple electronics radiators and can therefore be further subdivided into multiple independent electronics cooling subsystems.

According to the various embodiments described in the present disclosure, the electronics cooling system 28 may include one or more cooling devices or electronics radiators for providing adequate cooling capabilities and back-up cooling to ensure that the vehicle electronics are not overheated. The electronics cooling system 28 may include multiple radiators and/or condensers. These multiple devices may be connected in series (to provide sequential cooling) as described below with respect to FIG. 6 or connected in parallel as described below with respect to FIG. 7.

The fluid lines 32, 34, 42, 44, 52, 54 of the various subsystems may be configured to carry any suitable type of fluid used for cooling the respective heat generating components 16. For example, the fluids carried by the fluid lines 32, 34, 42, 44, 52, 54 and cooled by the respective cooling devices 24, 26, 28 of the cooling assembly 14 may include a liquid coolant, radiator fluid (e.g., water, antifreeze), condensed air, or other types of fluid.

The cooling assembly 14 may include radiators, condensers, etc., disposed near the front end of the vehicle 10 and may include any suitable structure for assisting with the cooling of the cooling fluid. For example, the devices 24, 26, 28 of the cooling assembly 14 may be air-cooled as a result of the vehicle 10 being in motion. Also, the devices 24, 26, 28 may include fins, large surface areas, or other features to help disperse heat. In addition, one or more fans may be used to blow air onto the outside surfaces of the devices 24, 26, 28 to help further disperse heat.

Furthermore, each of the various cooling subsystems may include a suitable type of temperature gauge, temperature sensing device, thermometer, thermostat, etc., connected to the various devices 24, 26, 28 and/or on the devices 24, 26, 28 to monitor and control temperature. The temperature devices may be used in conjunction with the pumps 36, 46, 56 to control the volume of fluid that each cooling subsystem is configured to circulate per unit time. In some embodiments, each of the fluid pumps 36, 46, 56 may be a 50-Watt pump.

Figure 3:
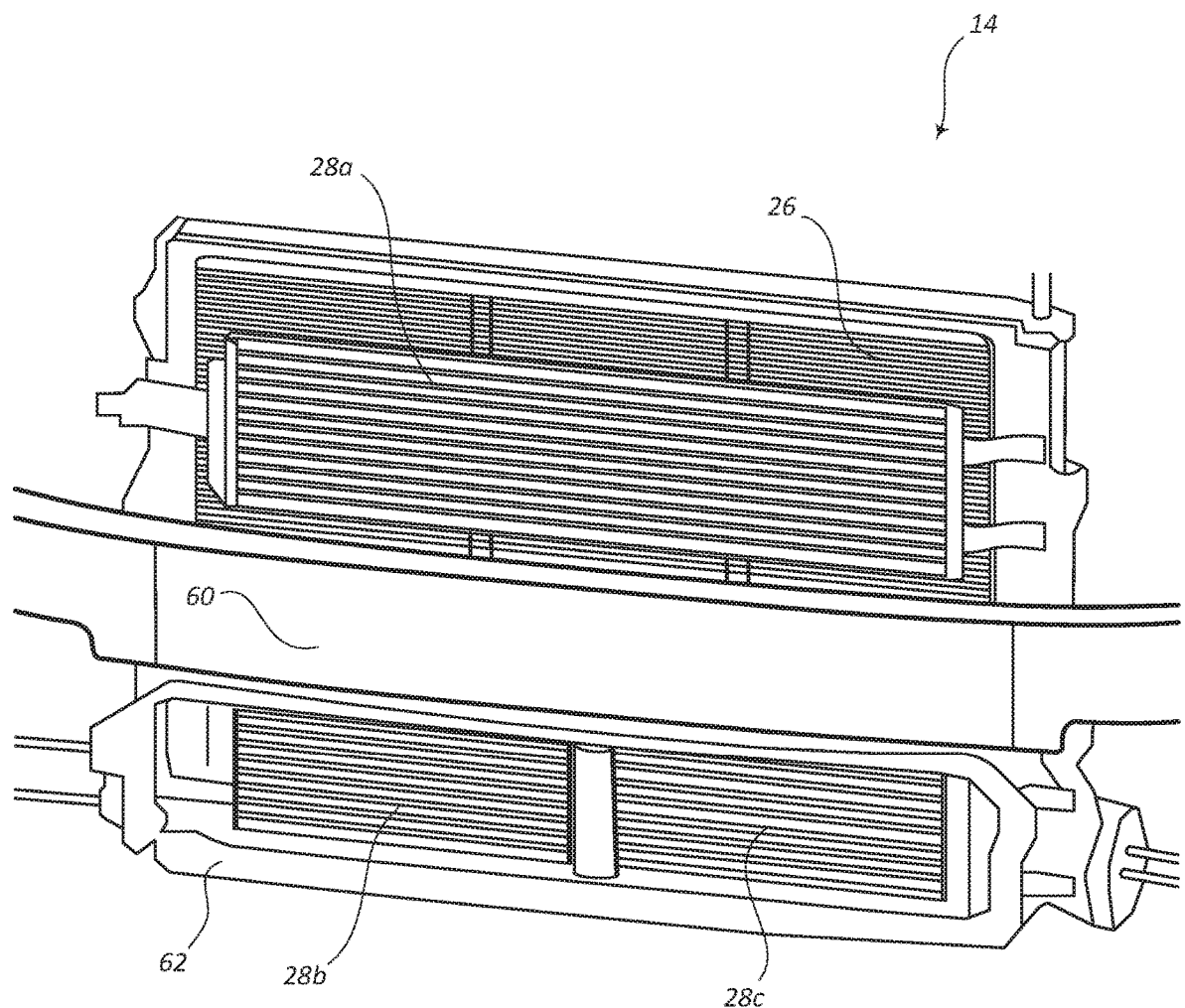
FIG. 3 is a perspective view of a cooling assembly of the cooling system of FIG. 2 positioned near a front end of the vehicle, according to various embodiments of the present disclosure.

FIG. 3 is a front perspective view of the cooling assembly 14 of the cooling system 12 of FIG. 2. The cooling assembly 14 may be positioned near a front end of the vehicle 10. In this embodiment, the electronics cooling system 28 shown in FIG. 2 may be configured with three cooling devices, including a first electronics radiator 28a, a second electronics radiator 28b, and a third electronics radiator 28c. According to other embodiments, the electronics cooling system 28 may include any number of radiators for cooling the electronic components 50 of the vehicle 10.

As shown in FIG. 3, the primary condenser 26 may be arranged in a top back position of the cooling assembly 14. The first electronics radiator 28a may be positioned in a top front position of the cooling assembly 14 and arranged in front of the primary condenser 26. The second electronics radiator 28b may be positioned in a bottom front right position of the cooling assembly 14 and the third electronics radiator 28c may be positioned in a bottom front left position of the cooling assembly 14 (from a driver's perspective facing in a forward direction). Thus, the second and third electronics radiators 28b, 28c may be positioned at a front position that is adjacent to (e.g., in substantially the same plane as) the first electronics radiator 28a with respect to a front-to-back perspective, the second and third electronics radiators 28b, 28c being below the first electronics radiator 28a. The primary radiator 24 (hidden from view in FIG. 3) may be arranged at a bottom back position of the cooling assembly 14 behind the second and third electronics radiators 28b, 28c. The primary radiator 24 may be adjacent to (e.g., in substantially the same plane as) the primary condenser 26 with respect to a front-to-back perspective.

The vehicle 10 may further include a cross bar 60, also referred to herein as a bumper reinforcement bar, radiator tie bar, or impact bar. The cross bar 60 may be configured to protect the cooling assembly 14 to some degree from a front end collision. The cross bar 60 may be positioned in front of the cooling assembly 14 and may include features that allow parts of the cooling assembly 14 to be connected thereto.

The second and third electronics radiators 28b, 28c may be disposed within a flow concentrator housing 62 or the like that is open to the front fascia of the vehicle 10. Optionally, the radiators 28b, 28c may be disposed adjacent to/below the first electronics radiator 28a.

Figure 4:
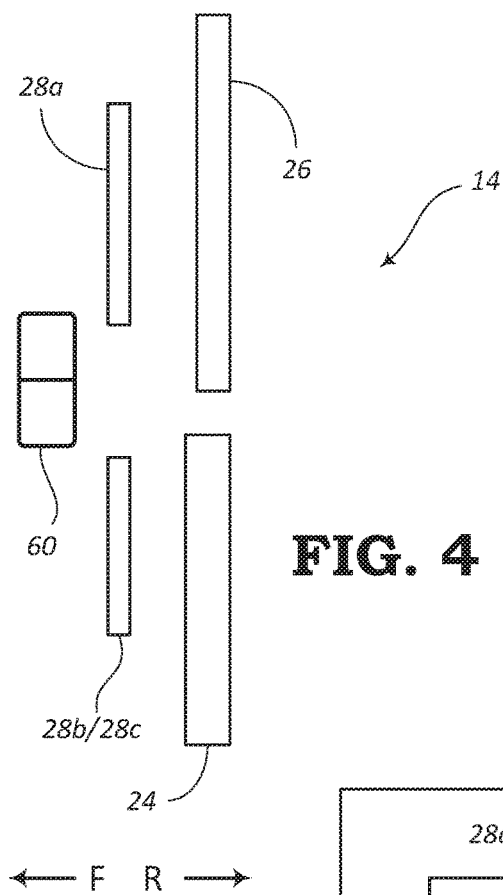
FIG. 4 is a side view of the cooling assembly of FIG. 3, according to various embodiments.
Figure 5:
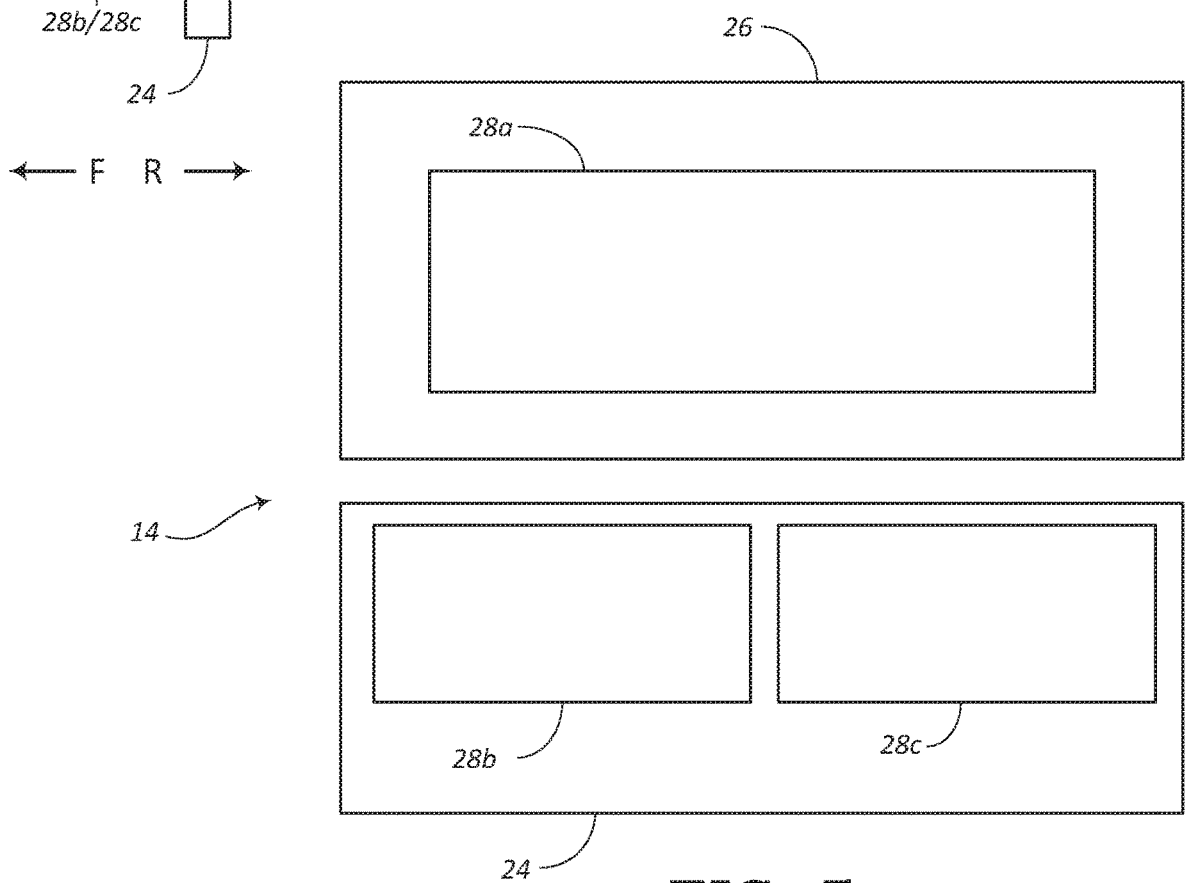
FIG. 5 is a front view of the cooling assembly of FIG. 2, according to various embodiments.

FIG. 4 is a side view of the cooling assembly 14 of FIG. 3, and FIG. 5 is a front view of the cooling assembly 14. The cross bar 60 is shown in FIG. 4 but is not shown in FIG. 5. As shown, the primary radiator 24 is arranged in a bottom rear position, the primary condenser 26 is shown in a top rear position, the first electronics radiator 28a is shown in a top front position, and the second and third electronics radiators 28b, 28c are shown in a bottom front position. The first electronics radiator 28a, second electronics radiator 28b, and third electronics radiator 28c may be adjacent to each other and arranged in substantially the same front plane. The primary radiator 24 and primary condenser 26 may be adjacent to each other and arranged in substantially the same rear plane. It should be noted that other arrangements of the various cooling devices 24, 26, 28a, 28b, 28c of the cooling assembly 14 are contemplated. Also, the primary radiator 24 may be placed behind and parallel with a plane in which the second and third electronics radiators 28b, 28c are arranged. The primary condenser 26 may be placed behind and parallel with the first electronics radiator 28a.

The primary AC condenser 26 may be configured to utilize the incoming airflow to condense circulating cooling fluid that is circulated to the evaporator 40 disposed adjacent to the interior passenger compartment or passenger space 38 of the vehicle 10. The evaporator 40 evaporates the circulating cooling fluid, thereby generating a cooling airflow that is delivered to the passenger space 38.

Figure 6:
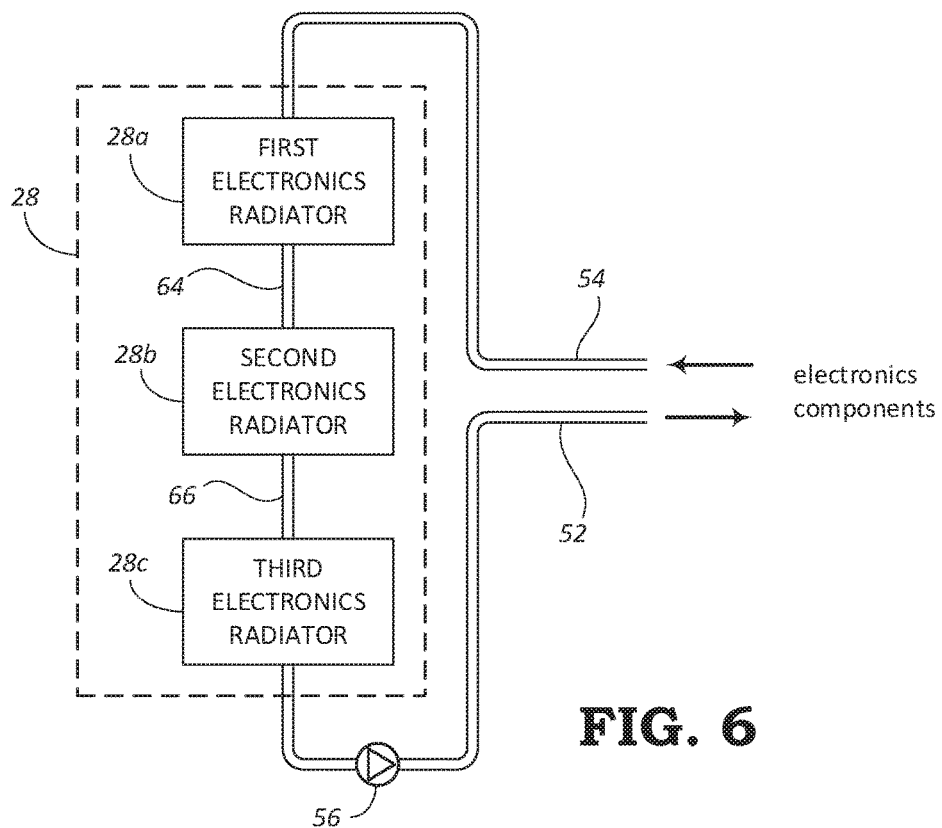
FIG. 6 is a schematic diagram illustrating an electronics cooling subsystem of the cooling system of FIG. 2 according to a first arrangement.

FIG. 6 shows a schematic diagram of a first arrangement of the electronics cooling system 28 for cooling the electronic components 50 as shown in FIG. 2. In this arrangement, the radiators are series-connected. The electronics cooling system 28 includes the first electronics radiator 28a, second electronics radiator 28b, and third electronics radiator 28c connected sequentially (i.e., in series). According to other embodiments, the electronics cooling system 28 may include any number of electronics radiators. The series-connected radiators are connected to the output fluid line 52 for supplying cooled cooling fluid to the electronics components and also connected to the input fluid line 54 for receiving heated cooling fluid from the electronics components. The pump 56 is shown in line with the output fluid line 52 for circulating the cooling fluid throughout the closed cooling subsystem for cooling the electronics components.

According to other embodiments, the various electronics radiators (e.g., radiators 28a, 28b, 28c) may be incorporated within independent electronics cooling subsystems. For instance, the first electronics radiator 28a may include associated output and input fluid lines for supplying fluid to/from a subset (e.g., one or more electrical devices) of the electronic components 50. Likewise, each of the other electronics radiators (e.g., radiators 28b, 28c, and/or additional radiators) may also include associated output/input fluid lines for supplying fluid to/from other subsets of the electronic components 50.

In order to continue the sequential flow of the cooling fluid, according to the embodiment of FIG. 6, the subsystem further includes a first connector line 64 that carries the cooling fluid from the first electronics radiator 28a to the second electronics radiator 28b. A second connector line 66 is configured to carry the cooling fluid from the second electronics radiator 28b to the third electronics radiator 28c. In this way, the sequential path allows each radiator 28a, 28b, 28c to contribute to the cooling effects of the cooling fluid such that the cooling fluid can be adequately cooled. Also, if one of the radiators 28a, 28b, 28c is unable, for whatever reason, to provide a cooling effect, the other two (or any other number of) radiators can continue to provide proper cooling.

Figure 7:
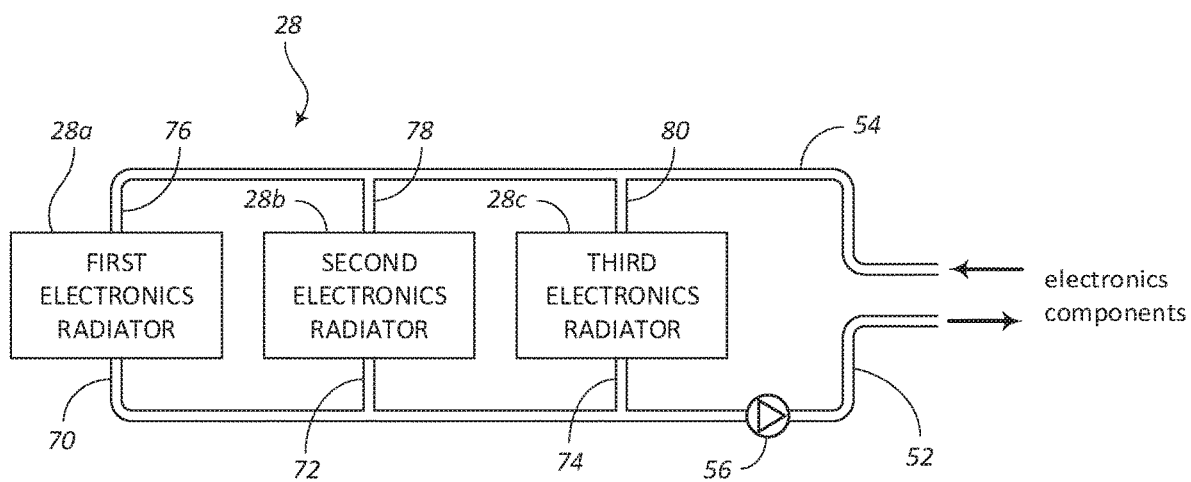
FIG. 7 is a schematic diagram illustrating an electronics cooling subsystem of the cooling system of FIG. 2 according to a second arrangement.

FIG. 7 shows a schematic diagram of the electronics cooling system 28 arranged in a different manner for cooling the electronics components 50 as shown in FIG. 2. According to this embodiment, the arrangement includes a parallel-connection between the radiators. For example, the electronics cooling system 28 includes the first electronics radiator 28a, second electronics radiator 28b, and third electronics radiator 28c connected in parallel. According to other embodiments, the electronics cooling system 28 may include any number of electronics radiators connected in parallel.

Each of the radiators is also connected directly to the output fluid line 52 and directly to the input fluid line 54 to allow each radiator to supply cooled cooling fluid to the electronics components and receive heated cooling fluid from the electronics components. A first output line 70 supplies fluid from the first electronics radiator 28a to the output fluid line 52. A second output line 72 supplies fluid from the second electronics radiator 28b to the output fluid line 52. Also, a third output line 74 supplies fluid from the third electronics radiator 28c to the output fluid line 52. The pump 56 is shown in line with the output fluid line 52 for circulating the cooling fluid throughout the closed cooling subsystem for cooling the electronics components.

Cooling fluid, heated by the electronics components, is returned to the electronics cooling system 28 via the input fluid line 54. A first input line 76 supplies some of the fluid from the input fluid line 54 to the first electronics radiator 28a. A second input line 78 supplies some of the fluid from the input fluid line 54 to the second electronics radiator 28b. Also, a third input line 80 supplies some of the fluid from the input fluid line 54 to the third electronics radiator 28c. Thus, the parallel connections of the output lines 70, 72, 74 and the input lines 76, 78, 80 allow each of the electronics radiators 28a, 28b, 28c to directly supply fluid to the electronics components and directly receive the fluid back from the electronics components. Also, if one of the radiators 28a, 28b, 28c becomes defective or is unable to provide a cooling effect, the other two radiators can continue to operate and provide proper cooling.

Other arrangements of the electronics radiators 28a, 28b, 28c are contemplated in the present disclosure. For example, the electronics cooling system 28 may include three or more electronic device radiators, where some radiators may be connected in parallel and some may be connected in series. The radiators may be arranged so as to include a series connection of two or more sets of parallel-connected radiators or may be arranged so as to include a parallel connection of sets of two or more radiators connected in series.

In one aspect, the cooling system 12 described in the present disclosure may be considered to include additional electronic device (ED) radiators. For example, the second electronics radiator 28b and the third electronics radiator 28c may be considered as additional radiators supplementary to a single conventional electronics radiator. These additional radiators 28b, 28c may be disposed in front of/adjacent to a conventional AC condenser (e.g., primary condenser 26) of the vehicle 10. The radiators 28a, 28b, 28c may be operable for circulating cooling fluid and exposing the cooling fluid to an airflow that removes heat from the cooling fluid to thereby cool the fluid.

The electronic components 50 may include, but are not limited to, an electric rear axle drive (ERAD), inverter electric motor (IEM), on-board charger (OBC), AD computer (E-Box), combined inverter and DCDC (CIDD), etc. In some embodiments, the electronic components 50 may include an electronics assembly that is mounted on the rooftop of the vehicle 10, such as a rooftop electronics assembly configured for autonomous functionality. For example, the rooftop electronics assembly may include cameras, video cameras, LiDAR, radar, and/or other suitable equipment for surveying the driving environment to assist with and/or control the driving functions of the vehicle 10 when the vehicle 10 is configured as an AD vehicle.

These electronic driving (ED) radiators or electronics radiators 28a, 28b, 28c of the electronics cooling system 28 may be thermally coupled to the cooled electronics 50, typically located rearward in the vehicle 10, such as in the back of the vehicle 10, by one or more cooling lines 52, 54 that carry cooling fluid between the ED radiators and the cooled electronics. This configuration provides an additional supply of cooling fluid to the cooled electronics, resulting in superior cooling performance.

Adding AD capabilities to a car increases the cooling demand as the computer and/or other electronics used to control the AD tasks generates more heat and thus needs to be cooled. Conventional cooling systems are not adequate to handle such high ambient temperatures. Therefore, the systems discussed in the present disclosure provide a greater cooling capacity to handle the cooling needs of the additional electronics components 50.

Although the present disclosure is illustrated and described herein with reference to preferred aspects and specific examples thereof, it will be readily apparent to those of ordinary skill in the art that other aspects and examples may perform similar functions and/or achieve like results. All such equivalent aspects and examples are within the spirit and scope of the present disclosure, are contemplated thereby, and are intended to be covered by the following non-limiting claims for all purposes.

What is claimed is:
1. A cooling system for a vehicle, the cooling system comprising:

a primary cooling assembly arranged near the front of the vehicle, the primary cooling assembly including at least one of an air conditioning condenser configured for cooling an interior passenger space of the vehicle and a radiator for cooling a power source of the vehicle;

an electronics cooling system including at least first and second electronics radiators arranged near the front of the vehicle, the first and second electronics radiators arranged in front of a front surface of the primary cooling assembly; and one or more cooling lines operable for carrying a cooling fluid between the first and second electronics radiators and one or more electronic components disposed in the vehicle remote from the first and second electronics radiators.

2. The cooling system of claim 1, wherein the one or more cooling lines are arranged with respect to the first electronics radiator and the second electronics radiator such that the first electronics radiator and the second electronics radiator are configured to operate in sequence.

3. The cooling system of claim 2, further comprising a connection line coupled between the first electronics radiator and the second electronics radiator, the connection line operable for carrying the cooling fluid between the first and second electronics radiators allowing the first electronics radiator and the second electronics radiator to operate in sequence.

4. The cooling system of claim 1, wherein the one or more cooling lines are arranged with respect to the first electronics radiator and the second electronics radiator such that the first electronics radiator and the second electronics radiator are configured to operate in parallel.

5. The cooling system of claim 4, further comprising input lines and output lines coupled between the first and second electronics radiators and the one or more cooling lines.

6. The cooling system of claim 1, further comprising one or more fluid pumps fluidly coupled to the one or more cooling lines.

7. The cooling system of claim 1, wherein the vehicle is an autonomous-driving (AD) or self-driving vehicle.

8. The cooling system of claim 1, wherein the primary cooling assembly includes an air conditioning condenser and a radiator, wherein the air conditioning condenser is configured to utilize an evaporator for cooling the interior passenger space of the vehicle, and wherein the radiator is configured to cool the power source of the vehicle.

9. The cooling system of claim 1, further comprising a third electronics radiator disposed in front of the front surface of the primary cooling assembly.

10. The cooling system of claim 9, wherein the first, second, and third electronics radiators are disposed adjacent to each other and in substantially the same plane.

11. The cooling system of claim 1, wherein the power source includes at least one of an internal combustion engine and a battery system.

12. An autonomous-driving vehicle comprising:
an air conditioning assembly having at least an air conditioner condenser;
a battery cooling assembly have at least a battery radiator; and
an electronics cooling assembly comprising:
a first electronics radiator disposed in front of the air conditioner condenser;
a second electronics radiator disposed in front of the battery radiator and adjacent to the first electronics radiator;
a third electronics radiator disposed in front of the battery radiator and adjacent to the first and second electronics radiators; and
one or more cooling lines operable for carrying a cooling fluid between the first, second, and third electronics radiators and one or more electronic components disposed remotely in the autonomous-driving vehicle.

13. The autonomous-driving vehicle of claim 12, wherein the first electronics radiator, second electronics radiator, and third electronics radiator are operated in sequence.

14. The autonomous-driving vehicle of claim 12, wherein the first electronics radiator, second electronics radiator, and third electronics radiator are operated in parallel.

15. The autonomous-driving vehicle of claim 14, wherein the one or more cooling lines are fluidly coupled to one or more additional cooling lines coupled to each of the first electronics radiator, second electronics radiator, and third electronics radiator.

16. The autonomous-driving vehicle of claim 12, wherein the electronics cooling assembly further comprises one or more fluid pumps fluidly coupled to the one or more cooling lines.

17. The autonomous-driving vehicle of claim 12, wherein the one or more electronics components include at least one of a computer or an electronic box (e-box) for controlling driving operations of the autonomous-driving vehicle, an on-board charger (OBC), a power inverter, an inverter electric motor (IEM), an electric rear axle driver (ERAD), and a combined inverter and DC/DC converter (CIDD).

18. The cooling system of claim 1, wherein the first electronics radiator and the second electronics radiator are disposed on opposite sides of an intervening bumper reinforcement bar.

19. The cooling system of claim 1, wherein the first electronics radiator and the second electronics radiator are disposed on a same side of an intervening bumper reinforcement bar.

20. The cooling system of claim 9, wherein the first electronics radiator and the second and third electronics radiators are disposed on opposite sides of an intervening bumper reinforcement bar.

* * * * *